Sept. 13, 1927. 1,641,977
A. S. LITTLEFIELD
MECHANICAL TOY
Filed March 4, 1927  8 Sheets-Sheet 1
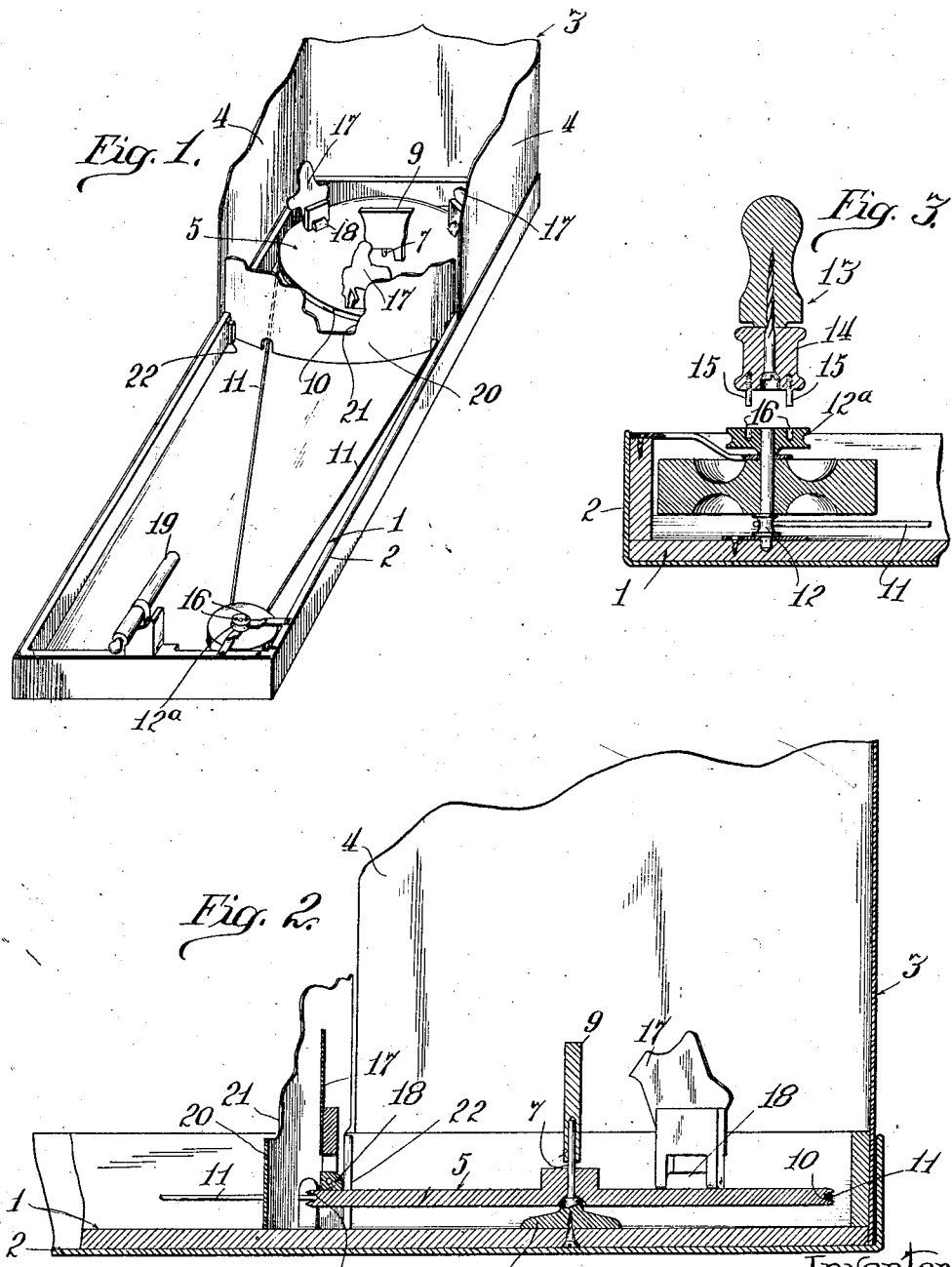

Sept. 13, 1927.
A. S. LITTLEFIELD
MECHANICAL TOY
Filed March 4, 1927
1,641,977
8 Sheets-Sheet 2
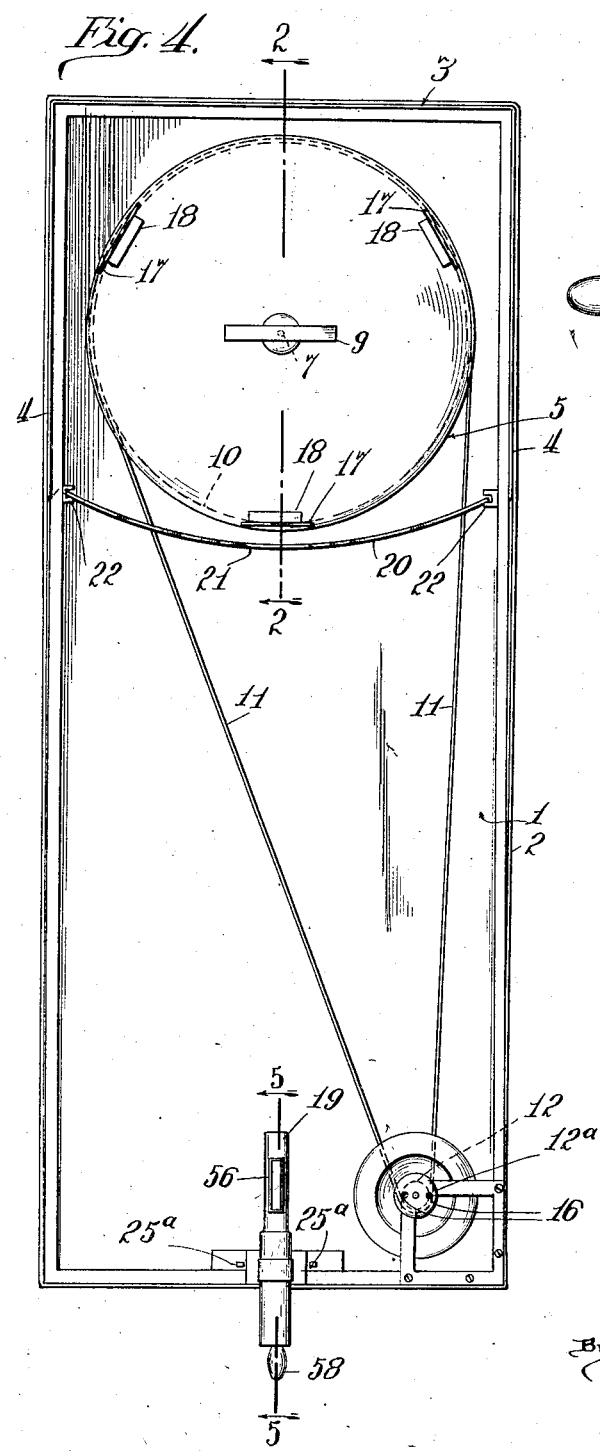
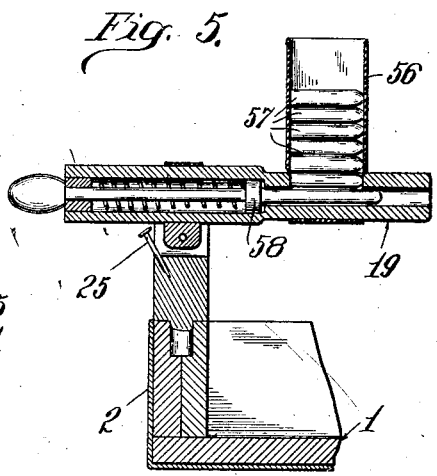
Inventor
Arthur S. Littlefield

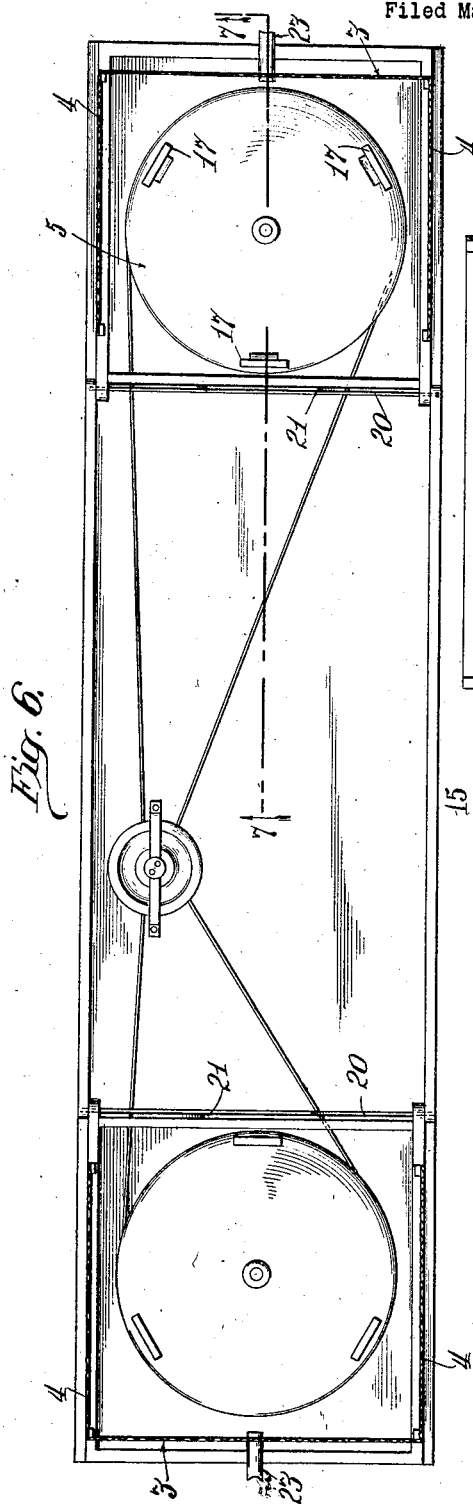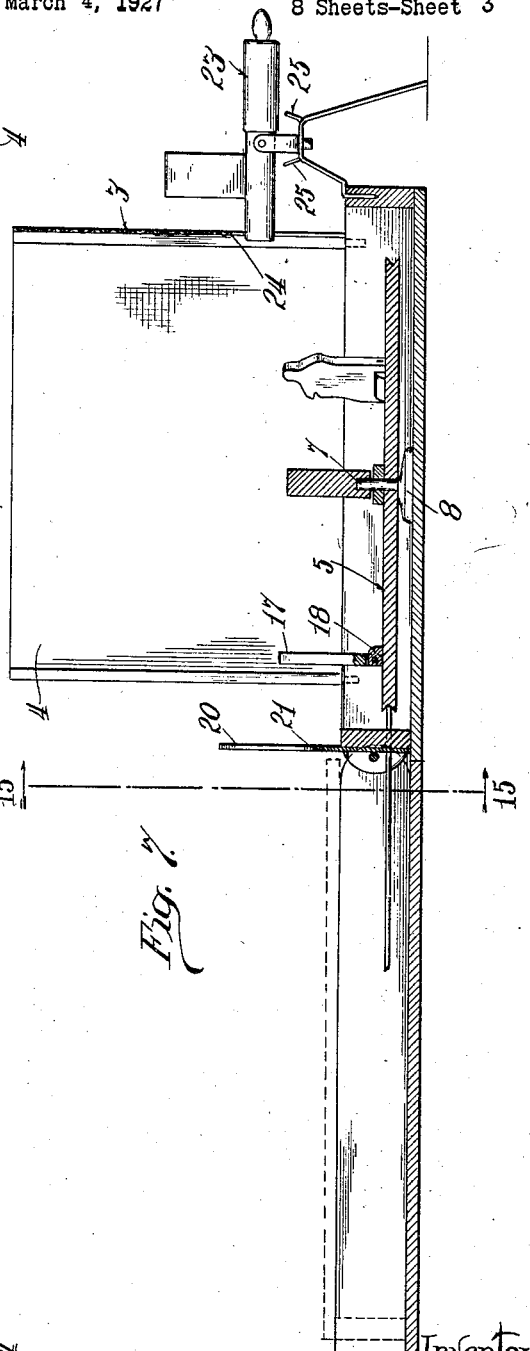

Sept. 13, 1927.  A. S. LITTLEFIELD  1,641,977
MECHANICAL TOY
Filed March 4, 1927  8 Sheets-Sheet 4
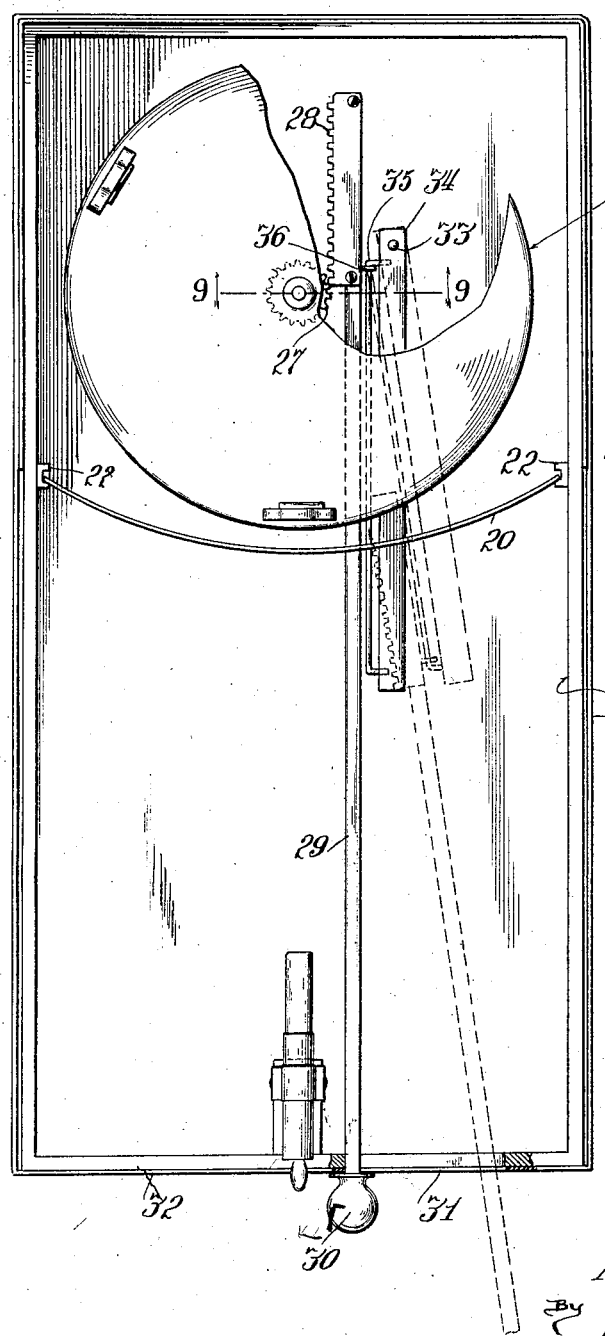
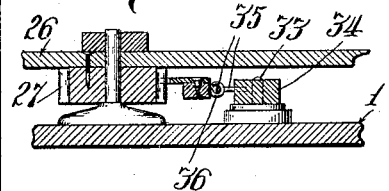
Inventor
Arthur S. Littlefield Sept. 13, 1927.
A. S. LITTLEFIELD
MECHANICAL TOY
Filed March 4, 1927
1,641,977
8 Sheets-Sheet 5
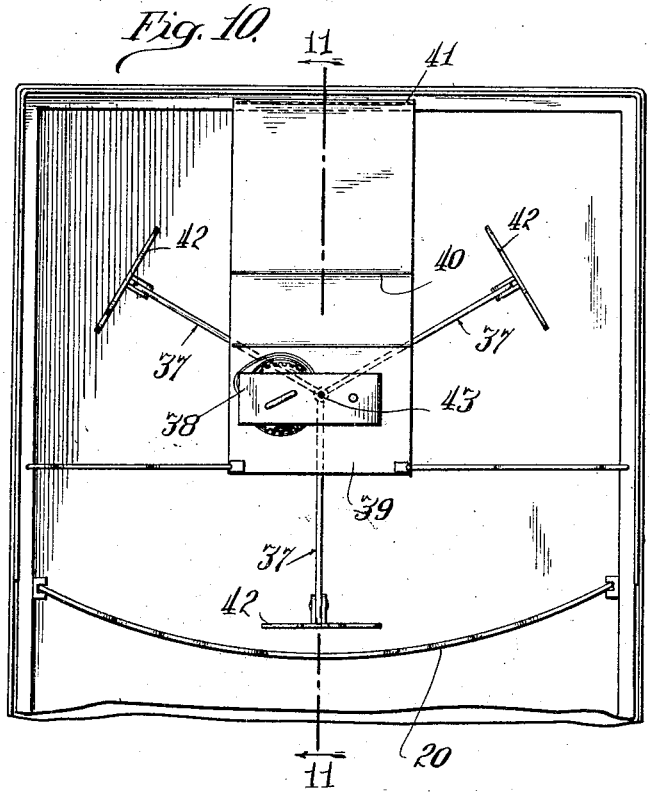
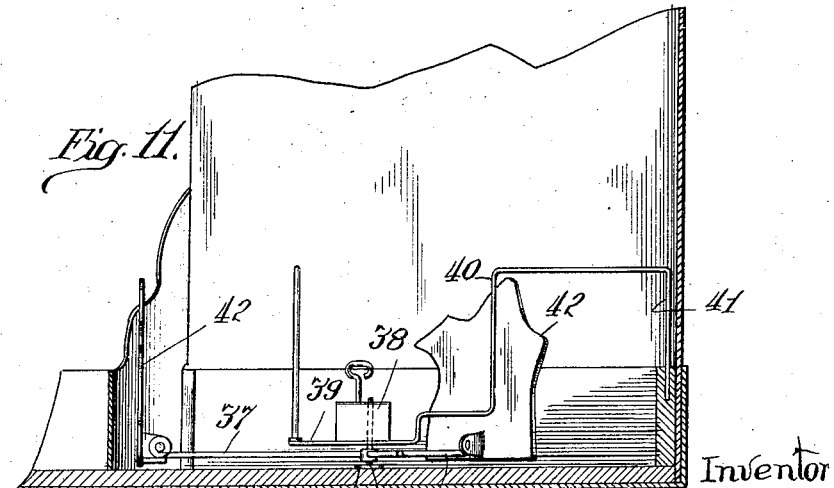
Inventor
Arthur S. Littlefield
By Radolph
Attorney Sept. 13, 1927.
A. S. LITTLEFIELD
MECHANICAL TOY
Filed March 4, 1927
1,641,977
8 Sheets-Sheet 6
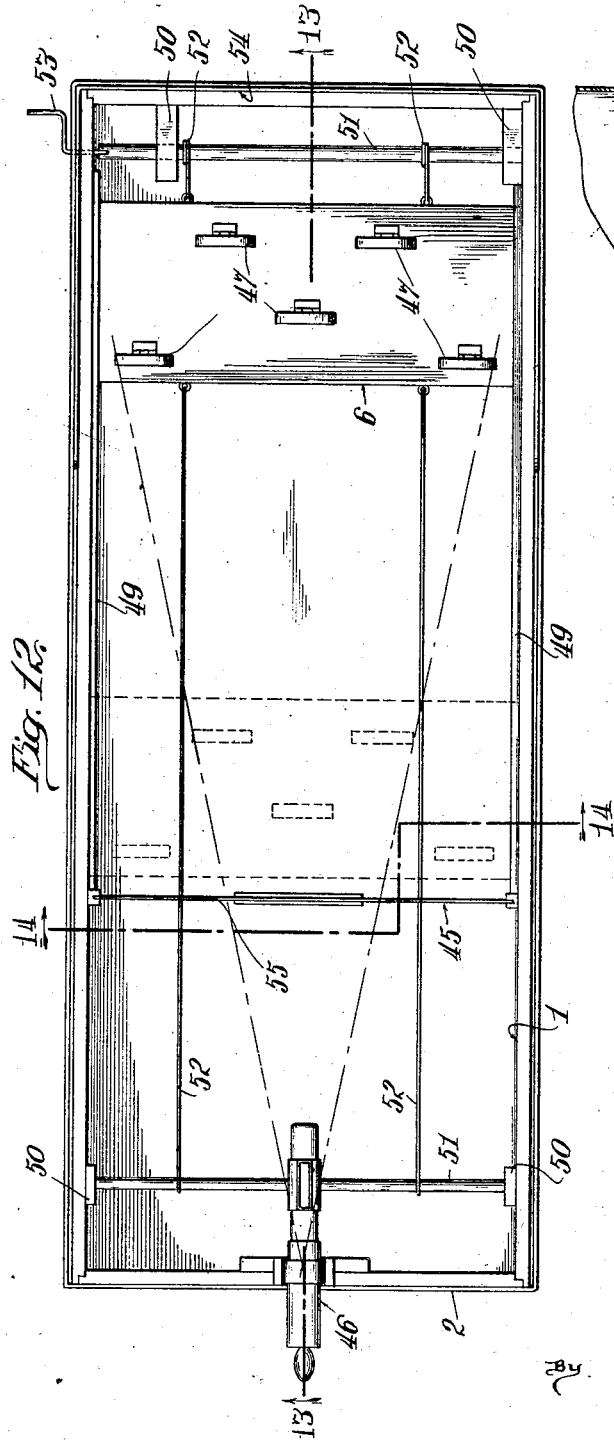
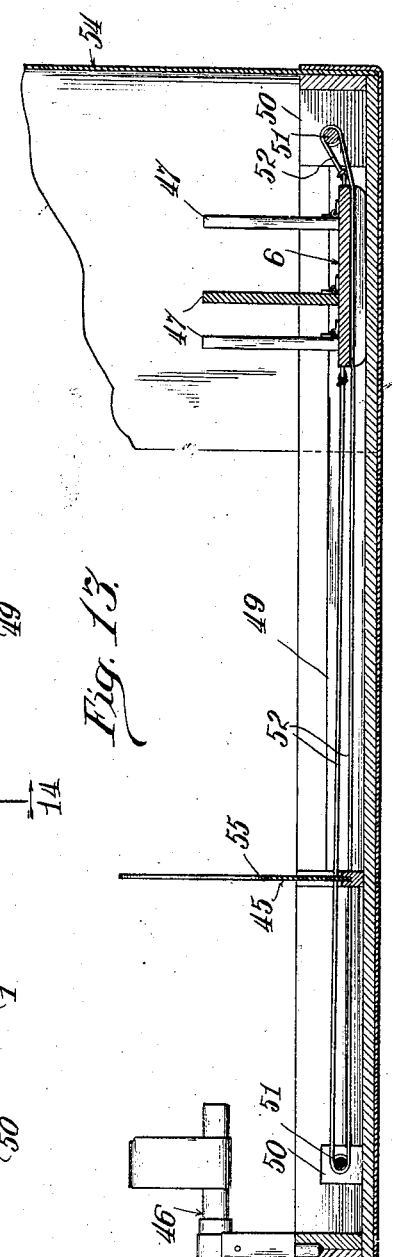
Inventor
Arthur S. Littlefield
Attorney Sept. 13, 1927.  A. S. LITTLEFIELD  1,641,977
MECHANICAL TOY
Filed March 4, 1927    8 Sheets-Sheet 7

Inventor
Arthur S. Littlefield
By
Attorney

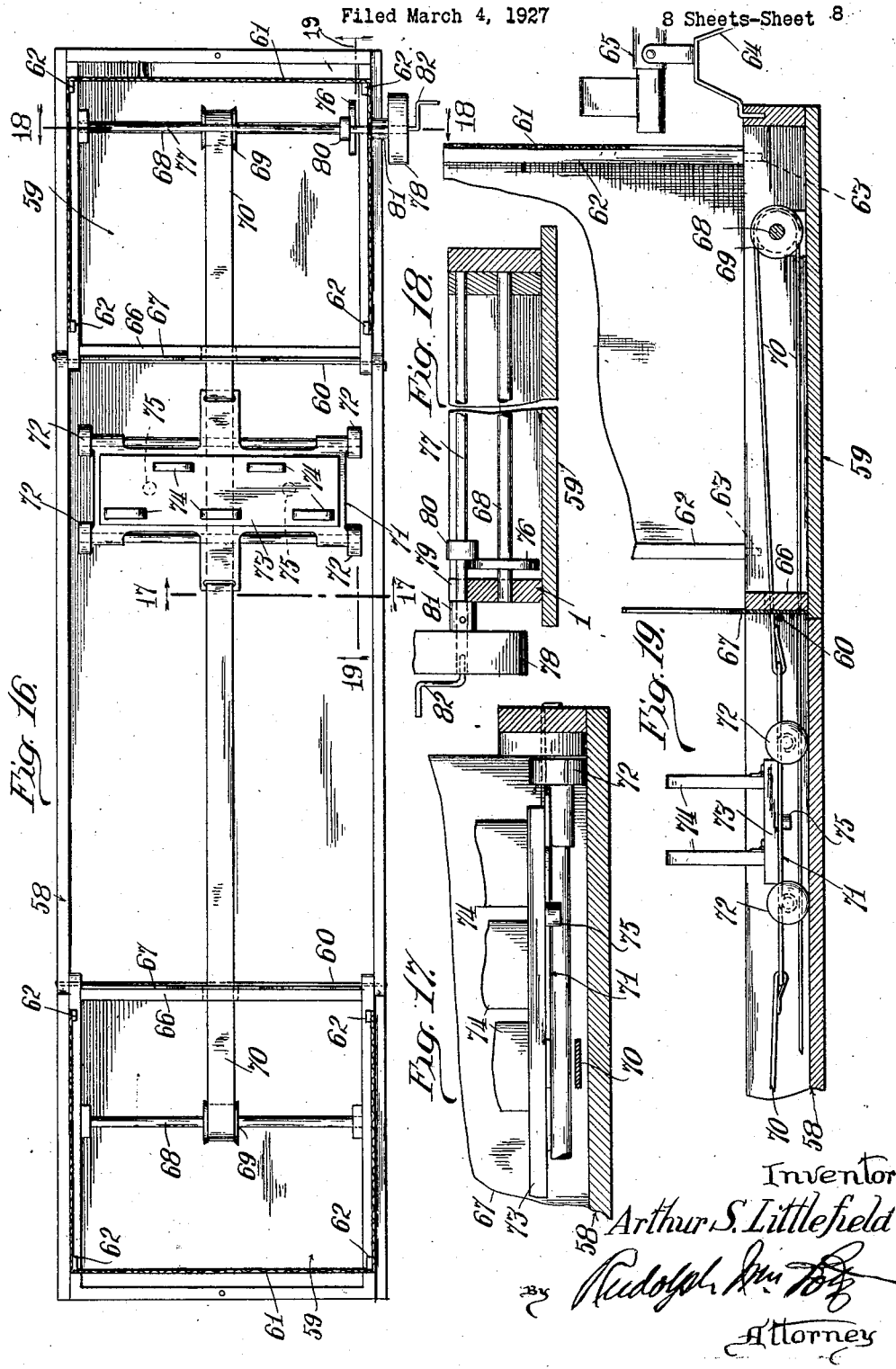

Patented Sept. 13, 1927.

1,641,977

UNITED STATES PATENT OFFICE.

ARTHUR S. LITTLEFIELD, OF WINNETKA, ILLINOIS, ASSIGNOR TO LITTLEFIELD MANUFACTURING COMPANY, OF CHICAGO, ILLINOIS, A CORPORATION OF ILLINOIS.

MECHANICAL TOY.

Application filed March 4, 1927. Serial No. 172,605.

This invention relates to improvements in mechanical toys of the type which includes a means, such as a toy gun, for directing projectiles and a target for the latter, the particular objects of the present invention being as follows.

In toys of the gun and target type, the projectiles are usually lost and litter the floor of the room by reason of the absence from the apparatus of means for preventing such loss. One important object of the invention is, therefore, to embody the toy in a receptacle adapted to contain all of the constituent parts and providing as a part thereof a foldable or collapsible backstop and coacting means thereon and on the receptacle for supporting the unfolded backstop in proper position for functioning during play to have the projectiles strike the same and drop into the now open receptacle.

A further important object of the invention is to provide the device with a movable support for the figures constituting the target for the projectiles and mechanism for effecting travel of said figures either manually or otherwise and to provide in connection with the thus movable targets, baffles to protect them against inaccurate shots except during a brief period of exposure.

Other objects of the invention will be hereinafter explained or will be readily understood from the following detailed description.

The invention may be variously embodied and in the accompanying drawings, I have illustrated various embodiments thereof. In said drawings:—

Fig. 1 is a perspective view of a mechanical toy or game apparatus constructed in accordance with the invention.

Fig. 2 is a fragmentary central vertical longitudinal section of the same on the line 2—2 of Fig. 4.

Fig. 3 is a fragmentary detail section of one type of target motor employed.

Fig. 4 is a top plan view of the structure shown in Figs. 1, 2 and 3.

Fig. 5 is a sectional view showing a magazine gun and mounting adapted to be used.

Fig. 6 is a top plan view of a duplex structure of substantially the type shown in Fig. 1 for simultaneous use by two players.

Fig. 7 is a vertical longitudinal section on the line 7—7 of Fig. 6.

Fig. 8 is a plan view of an apparatus similar to that shown in Fig. 1 and illustrating another means for manually effecting target-travel.

Fig. 9 is a detail section on the line 9—9 of Fig. 8.

Fig. 10 is a fragmentary plan view showing another embodiment of the invention.

Fig. 11 is a section of the same on the line 11—11 of Fig. 10.

Fig. 12 is a plan view of still another embodiment of the invention.

Fig. 13 is a vertical longitudinal section of the same on the line 13—13 of Fig. 12.

Fig. 16 is a top plan view of still another embodiment of the invention.

Figure 14:
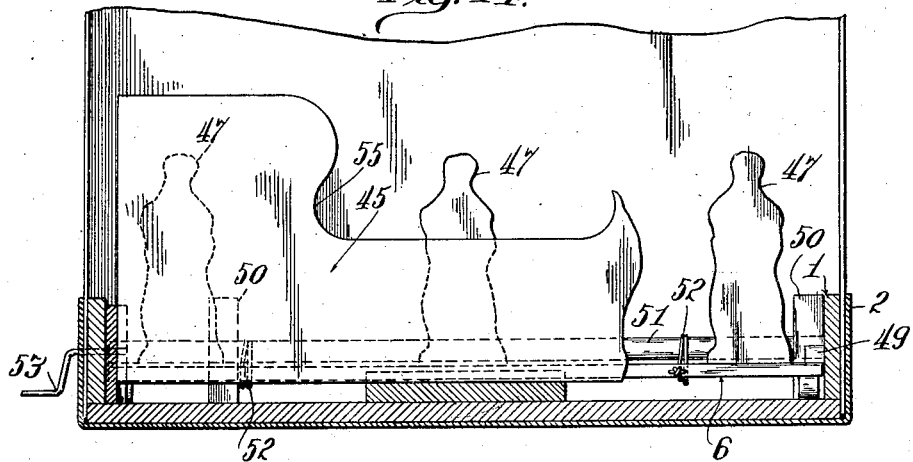
Fig. 14 is a transverse section on the line 14—14 of Fig. 12.
Figure 15:
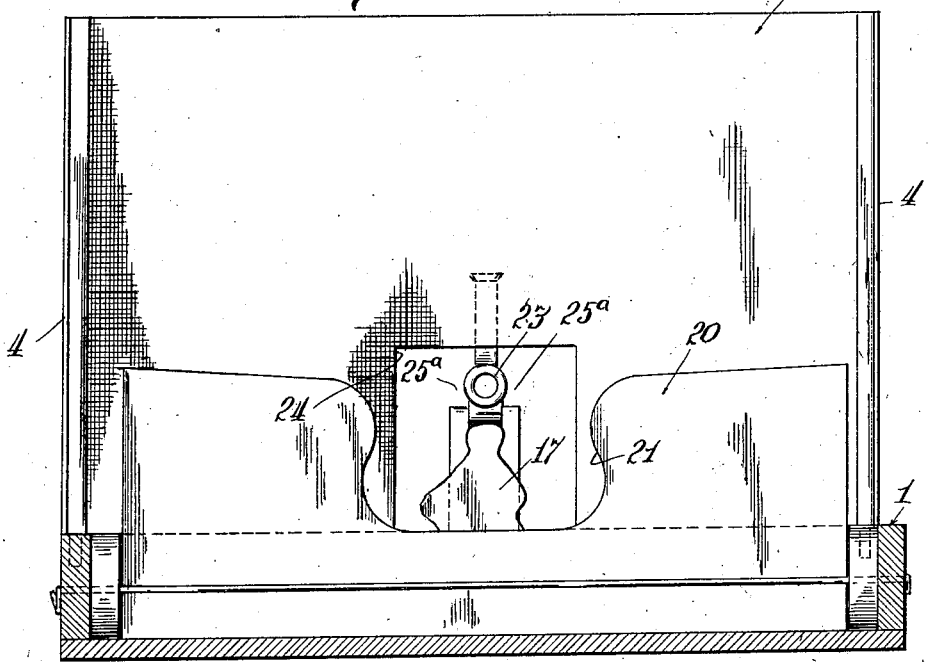
Fig. 15 is a transverse section on the line 15—15 of Fig. 7.

Figs. 17 and 18 are transverse sections on the lines 17—17 and 18—18, respectively, of Fig. 16.

Fig. 19 is a fragmentary longitudinal section on the lines 19—19 of Fig. 16.

The invention, in all of its embodiments, includes a suitable receptacle comprising a plurality of members adapted to be relatively disposed to constitute a container for the several operative elements when not in use and as a base and open container therefor when in use. It also includes a collapsible back-stop and coacting means on the latter and the receptacle, when open, for engaging and supporting said back-stop. It further includes a demountable spring gun; a movable support for the target elements, and means for effecting movement of said support; and a fortress wall plate having a gap through which the target elements come into gun range, the various embodiments illustrated differing from each other only in such details of construction and operation as are hereinafter specifically pointed out.

The receptacle consists, preferably, of a body section 1 and a cover section 2, both of substantially the same depth and telescopically fitted together to provide a closed receptacle or a double walled open receptacle or base, there being a limited space between the peripheral walls of the members 1 and 2 to receive the lower edge portion of the backstop member 3 which consists, preferably, of a piece of cardboard scored for folding to provide the side walls 4 when set up in operative position and for folding flat to be contained in the receptacle when closed.

The body member 1 of the receptacle is preferably made of wood and the cover section of card-board as this requires to be of less strength than the body section which is equipped with the operating mechanism. The latter comprises, preferably, a movable support for target figures, said support consisting either of a rotary member such as the rotatable platform 5 of Figs. 1, 3, 4 and 8 or the longitudinally movable platform or carriage 6 of Figs. 12 to 14, inclusive, the rotatable member being preferred because better adapted for motor actuation. Thus in Figs. 1, 3, 4 and 8, the rotatable platform or turn-table 5 is pivotally mounted upon the vertical stud shaft 7 having the base 8 rigid therewith and rigidly secured to the bottom of the member 1, a baffle plate 9 being non-rotatably mounted upon the upper end portion of said shaft 7. The turn-table 5 is provided with an annular groove 10 in its circumferential edge in which the belt 11 engages, the latter being also trained over a sheave 12 of the motor which may be of any desired type but is here exemplified as consisting of a fly wheel with which the sheave 12 is rigid, a handle member 13 upon which a spool 14 is rotatably mounted, said spool being provided with a pair of projections 15 at its free end for engaging in a pair of openings 16 in the sheave 12ª. A cord is wound about the spool, the latter held in engagement with the sheave 12 while the cord is pulled for unwinding to effect rapid rotation of the sheave and flywheel, the momentum of the latter maintaining the turn-table in rotation. This type of motor is obviously the equivalent of a spring motor and both these types are substantially equivalent to direct manual operation in that they differ from the latter only in releasing previously stored manual energy. It will be obvious, of course, that the motive member exemplified above may be replaced by a small electric motor without departing from the invention.

Target figures 17 are secured by means of hinges 18 to the turn-table and are arranged to fall toward the axis of rotation of the latter when hit by a projectile from the gun 19, which preferably, is mounted for universal pivotal movement upon the end wall of the member 1 opposite the back-stop member. Between the turn-table and said gun 19, I provide a wall 20 which, for convenience, I term a "fortress wall" made preferably of card-board of a height greater than that of the standing target figures on the turn-table, said wall having a middle recess or gap 21 which said figures pass during rotation. The said wall 20 is held in guides 22 secured to the side walls of the member 1 and is, preferably, of such greater width than the latter or the space between guide members 22 as to require flexing to an arcuate form before it will fit the guides.

As shown in Fig. 6, the structure may include two of said turn-tables operable from a single motor, each turn-table being associated with a back-stop wall and a fortress wall. In this structure the guns 23 are mounted at elevations about the tops of the target figures and baffle wall and have their muzzles projecting through openings 24 in the back-stop walls, the advantage of this arrangement being that two persons may play simultaneously.

In place of swiveled guns which would permit projectiles to be directed to a height above the top of the opposed back-stop wall, it is preferable to employ swivels having a horizontal and vertical axes, respectively, and such limited pivotal movement as is necessary to prevent projectiles from being directed outside the confines of the back-stop wall, these limitations being easily effected by means of suitable stops 25 and 25ª associated with the gun carriages, the side and top walls of the openings 24 being capable of constituting such stops.

The above described arrangement permits rotation of the turn-table or turn-tables of the apparatus to be rotated at such moderate speed as will permit aim and fire during the interval of travel of a target figure past the recess or gap 21 of the wall 20, such moderate speed being also attainable by means of a spring motor or an electrical motor or by direct manual operation of the turn-table but in Fig. 8, I have shown manually operable means for imparting rapid rotation of the turn-table 26 there shown, the latter constituting a fly-wheel. The said turn-table 26 is provided on its bottom with an axially disposed spur pinion 27 rigid therewith and adapted to mesh with the rack-bar 28 constituting part of a rod or plunger 29 which has the knob 30 at one end, the latter projecting through the lateral slot 31 in the front wall of the member 32 corresponding to the member 1 heretofore described. Pivotally secured at one end by means of the pin 33 to the bottom wall of the member 32 is guide member 34 which carries the wire guide 35 having perpendicularly disposed end portions driven into the member 34. A staple or other loop member 36 on the back of the rack-bar engages the wire 35 for limiting the reciprocable stroke of the rack-bar. The pivot pin 33 is so disposed relatively to the pinion 27 as to permit the rack-bar to be thrown into and out of mesh with said pinion, the full line position of said rack and rod being the normal one for effecting rotation of the turntable by pulling the rod longitudinally to the limit of movement fixed by the wire guide 35 at which limit the rack-bar will be out of mesh with the pinion. A strong pull will set the turn-table into rapid rotation which will continue for some time after the said rack-bar and pinion are out of mesh with each other. To effect reintermeshing, the outer end portion of the plunger 29 is swung to the right as shown in dotted lines in Fig. 8, then returning it to the inner limit of its movement and swinging it back to the full line position shown. In using this construction shooting may be deferred until the turn-table has slowed down to a sufficient moderate speed to permit of air and fire during the interval of passage of a target figure as above pointed out.

In Figs. 10 and 11, I have illustrated an embodiment of the invention wherein a skeleton turn-table 37 is employed in connection with a spring motor 38, a shaft of which carries the member 37. Said motor is mounted upon the platform 39 of a sheet-metal member which includes the vertical wall portions 40 and 41, the latter suitably detachably secured to the rear end wall of the body member of the receptacle shown. The target figures 42 which are hinged to the member 37, pass, during rotation, between the walls 40 and 41, the former of which constitutes a baffle wall opposed to the gap in the fortress wall. The platform 39 is spaced from the bottom of the receptacle body and may be suitably supported by having the lower end of the shaft 43 carrying the member 37 rest upon the said receptacle bottom or engage in a bearing 44 fitted thereto.

The invention may also be embodied as shown in Figs. 12 to 14, inclusive, wherein the fortress wall 45 is disposed nearer the gun 46 than in the other embodiments and the target figures 47 are mounted on a platform or carriage 6 which is reciprocable longitudinally of the receptacle 1 in suitable guides 49 mounted on the side walls thereof. Mounted in bearings 50 carried by the said side walls are two shafts 51 over which the belts 52 are trained, said belts being secured to the platform 6, one of said shafts being adapted to be rotated by means of a detachable crank 53 to effect travel of said carriage. The latter travels between the back-stop wall 54 and the fortress wall 45 and the target figures 47 are disposed in rows in staggered relation to each other on said platform, the outermost target figures passing out of gun range as the platform approaches the fortress wall because the gap 55 in the latter is of such width and so disposed relatively to the muzzle of the gun as to dispose said figures beyond protection of the side portions of the fortress wall only when the platform is disposed at and near the far limit of its movement relatively to the fortress wall.

Obviously, the target figures of each of the several embodiments of the invention may be variously numbered in order that the players may keep score for competitive purposes.

I prefer to employ magazine guns each of which is provided in its barrel with a suitable opening with which the rectangular tube 56 communicates, the several projectiles 57 being contained in the latter and the lowest of the latter normally resting on the spring-held plunger 58. As the latter is digitally drawn back to the rearward limit of its movement, the lowermost projectile will drop into the gun barrel for projection from the muzzle as the plunger is released, it being understood, of course, that the shape of the projectiles and magazine tube may be varied as desired.

In Figs. 16 to 19 inclusive, I have illustrated a structure which is somewhat similar to that shown in Figs. 12 to 15 inclusive, but differing from the latter in certain details.

In this structure, the receptacle consists of a middle portion 58 and two end portions 59 the side walls of which are inwardly offset from those of the member 58 and are pivotally associated with the latter by means of the wires 60. The relative lengths of the members 58 and 59 are such that when the latter are turned to lie entirely between the side walls of the member 58, the outer end walls of the members 59 are almost in contact with each other.

The foldable or collapsible back-stop walls 61 include the posts 62 terminating at their lower ends in dowels 63 fitting openings in the upper edges of the side walls of the members 59, the gun carriages 64 being also similarly pivotally associated with the other end walls of the members 59, the guns 65 having their muzzles opposed to openings in the back-stop walls.

The members 59 have inner end walls 66 between which and the wires 60 the lower edge portions of the fortress walls 67 are engaged for supporting the latter, said walls having middle gaps.

Rotatably mounted in bearings in the side walls of the members 59 are shafts 68 each carrying a pulley 69 over which the belt 70 is trained, the latter being connected at its ends with the carriage 71 mounted on wheels 72 for travel longitudinally of the member 58 between the fortress walls 67. The carriage 71 carries the platform or support 73 on which one or more rows of target figures or elements 74 are pivotally mounted, said platform 73 being detachable from the carriage 71 by means of the dowel-joints 75 to permit the target elements 74 to be disposed to face in the direction of travel of the carriage toward the gun to be fired or operated, the target elements 74 of this structure being disposed similarly to those of the structure illustrated in Figs. 12 to 15 with reference to the gaps in the fortress walls and the muzzles of the guns.

The structure of Figs. 16 to 19 is adapted to constitute a game apparatus to be played by either one or two persons and, in order that it may be successfully played by one person, I provide one of the shafts 68 with a friction wheel 76 upon which the end portion of the shaft 77 which carries the flywheel 78 rests, said end portion of said shaft being disposed in a vertical slot 79 in the adjacent side wall of one of the members 59. The other end of said shaft 77 engages in an opening in the other side wall of the said member 59 and, to prevent longitudinal movement of said shaft, collars 80 and 81 are provided thereon for engaging the inner face of the wheel 76 and the outer face of the side wall opposed to the fly-wheel, the latter being adapted to be digitally set into rapid motion to acquire the momentum necessary to maintain it in rotation for a period necessary to effect travel of the carriage from one to the other limit of its movement so that an individual player may set the target figures in motion by means of a quick movement of a hand in momentary contact with the fly-wheel and thereafter operate one of the guns during ensuing travel of the carriage. The said shaft 77 is also equipped with a preferably detachable crank 82 to be operated by one player while the the other operates a gun.

Obviously the player who most often shoots down the outer target figures while exposed to gun fire through the gap in the target wall at his end of the structure would be the winner of the game, it being the object of the other player to cause the highest attainable speed of travel of the target elements in order to prevent his rival from scoring the maximum number of hits.

I claim as my invention:—

1. A mechanical toy including a receptacle equipped at one end with means for projecting a projectile, a target between the ends of said receptacle, a foldable and detachable back-stop wall at the other end of said receptacle, and coacting interengageable means on said wall and said receptacle for detachably securing the former to the latter while in unfolded position.

2. A mechanical toy including a receptacle including a body portion and cover member for telescopically associating therewith to provide a closed receptacle or double walled open receptacle, a foldable wall including a middle portion and side portions adapted when folded, to be contained within the closed receptacle and when unfolded to having its lower edge portion disposed between portions of the body and cover for support in upright position at one end of the receptacle when open to constitute a back-step wall, a projectile projecting device arranged for detachable mounting at the other end of the receptacle, and a target for said device.

3. A mechanical toy including a receptacle including a body portion and cover member for telescopic association to provide a closed receptacle or double walled open receptacle, a foldable wall including a middle portion and side portions adapted, when folded, to be contained within the closed receptacle and when unfolded, to having its lower edge portion disposed between portions of the body and cover for support in upright position at one end of the receptacle when open to constitute a back-stop wall, a projectile projecting device arranged for detachable mounting at the other end of the receptacle, a recessed fortress wall arranged between the said back-stop wall and the said device, and a target arranged between said walls.

4. A mechanical toy including a receptacle including a body portion and cover member for telescopic association to provide a closed receptacle or double walled open receptacle, a foldable wall including a middle portion and side portions adapted, when folded, to be contained within the closed receptacle and when unfolded, to having its lower edge portion disposed between portions of the body and cover for support in upright position at one end of the receptacle when open to constitute a back-stop wall, a projectile projecting device arranged for detachable mounting at the other end of the receptacle, a recessed fortress wall arranged between the said back-stop wall and the said device, a movable target carrier disposed between said walls, and target elements mounted on said carrier.

5. A mechanical toy including a receptacle including a body portion and cover member for telescopic association to provide a closed receptacle or double walled open receptacle, a foldable wall including a middle portion and side portions adapted, when folded, to be contained within the closed receptacle and when unfolded, to having its lower edge portion disposed between portions of the body and cover for support in upright position at one end of the receptacle when open to constitute a back-stop wall, a detachable gun carriage arranged for pivotal movement on the end wall of the open receptacle opposite the back-stop wall, a gun pivotally mounted on said carriage, for substantially universal movement relatively to said receptacle, a movable target arranged adjacent said back-stop wall, and means for imparting movement to said target.

6. A gun and target toy including a base, a back-stop wall at one end thereof, a fortress wall between the ends thereof provided with a gap, a movable target carrying element disposed between said walls, target members mounted on said target carrying element, and means for imparting movement to said element to cause the said target members to pass said gap at intervals to thereby be brought into and out of range of projectiles from a projecting device disposed opposite said gap and said walls, said base comprising a receptacle and closure therefor adapted when closed to contain all of the aforesaid elements and members.

7. A gun and target toy comprising a receptacle adapted to constitute a base, a projectile projecting device, a foldable back-stop wall, a fortress wall, a movable target and a motor therefor adapted to be contained in said receptacle when closed, means included in the latter for supporting said walls in upright position when said receptacle is open with the back-stop wall behind and the fortress wall in front of the target and between the latter and the projecting device, the said target including elements adapted to change position when hit by a projectile.

8. A mechanical toy comprising a base, a projectile projecting device adapted to be disposed at one end thereof, a wall member having a gap disposed between the ends thereof, a platform movable longitudinally of said base disposed behind said wall, a plurality of target elements pivotally mounted on said platform at intervals from one side edge portion to the other side edge portion thereof, means for effecting travel of said platform toward and from said wall, said gap and gun arranged relatively to the target elements to cause all of the latter to be exposed to projectiles from the gun when said platform is disposed at and near the far limit of its travel relatively to said wall and cause the elements nearest the side edge portions of the platform to become disposed behind the wall on either side of said gap out of range of projectiles as said platform approaches said wall.

9. A mechanical toy comprising a base, a projectile projecting device adapted to be disposed at one end thereof, a wall member having a gap disposed between the ends thereof, a platform movable longitudinally of said base disposed behind said wall, a plurality of target elements pivotally mounted on said platform at intervals from one side edge portion to the other side edge portion thereof, means for effecting travel of said platform toward and from said wall, said gap and gun arranged relatively to the target elements to cause all of the latter to be exposed to projectiles from the gun when said platform is disposed at and near the far limit of its travel relatively to said wall and cause the elements nearest the side edge portions of the platform to become disposed behind the wall on either side of said gap out of range of projectiles as said platform approaches said wall, and a back-stop wall at the far end of the base relatively to the projecting device.

10. A gun and target toy including a receptacle and cover therefor, a foldable back-stop wall, a fortress wall, a gun and a longitudinally movable platform carrying a lateral row of pivoted target figures all adapted to be contained within the receptacle when closed, guides in the latter for confining the platform to a predetermined path of movement, coacting means on the receptacle and said gun and respective walls for supporting the same in predetermined positions on the receptacle when open with the gun and back-stop walls disposed at opposite extreme ends thereof and said fortress wall between the gun and the platform, and means for effecting travel of the platform toward and from the fortress wall to thereby cause certain of the target elements to be brought out of and into range of projectiles through said gap.

11. A gun and target toy comprising a receptacle open at the top, a back-stop wall detachably mounted upon one end thereof, a pair of vertical guide elements on the side walls between the ends thereof, a fortress wall detachably supported in said guides, horizontal guide members on the side walls of said receptacle between the vertical guide elements and the back-stop wall, a platform movable in said horizontal guides, means for imparting movement thereto, a plurality of target elements carried by said platform, and a universally movable gun mounted on the other end of the receptacle, there being a gap between the side edges of the fortress wall through which all of the target elements are exposed to gun-fire when the platform is adjacent to the back-stop wall.

ARTHUR S. LITTLEFIELD.